(12) United States Patent
Tripp et al.

(10) Patent No.: US 11,077,486 B2
(45) Date of Patent: Aug. 3, 2021

(54) INTERCHANGEABLE DIE, JOINING TOOL AND JOINING METHOD

(71) Applicant: NEWFREY LLC, New Britain, CT (US)

(72) Inventors: Andreas Tripp, Giessen (DE); Joachim Moeser, Giessen (DE)

(73) Assignee: NEWFREY LLC, New Britain, CT (US)

( * ) Notice: Subject to any disclaimer, the term of this patent is extended or adjusted under 35 U.S.C. 154(b) by 451 days.

(21) Appl. No.: 15/656,368

(22) Filed: Jul. 21, 2017

(65) Prior Publication Data

US 2017/0320127 A1 Nov. 9, 2017

Related U.S. Application Data

(63) Continuation of application No. PCT/EP2016/050280, filed on Jan. 8, 2016.

(30) Foreign Application Priority Data

Jan. 22, 2015 (DE) .......................... 102015100922.6

(51) Int. Cl.
  *B21J 15/36* (2006.01)
  *B21J 15/02* (2006.01)
  *B21J 15/10* (2006.01)
  *B23B 31/113* (2006.01)
  *F16D 1/112* (2006.01)

(52) U.S. Cl.
  CPC .............. *B21J 15/36* (2013.01); *B21J 15/025* (2013.01); *B21J 15/10* (2013.01); *B23B 31/113* (2013.01); *F16D 1/112* (2013.01)

(58) Field of Classification Search
  CPC .......... B21J 15/36; B21J 15/10; B21J 15/025; B23B 31/113; F16D 1/112
  See application file for complete search history.

(56) References Cited

U.S. PATENT DOCUMENTS 2,219,907 A 10/1940 Ross
2,526,998 A 10/1950 Davis
(Continued)

FOREIGN PATENT DOCUMENTS

DE 20016091 U 11/2000
DE 10335085 A 2/2006
(Continued)

*Primary Examiner* — Jacob J Cigna
(74) *Attorney, Agent, or Firm* — Michael P. Leary

(57) ABSTRACT

An interchangeable die comprises a die head, on which a die feature is formed, and a die shank extending in an axial direction from the die head. The die shank includes a first axial shank section, which is adjacent to the die head, and a second axial shank section, which is arranged on the opposite axial side of the first axial shank section from the die head. The first axial shank section has a first diameter and the second axial shank section has a second diameter smaller than the first diameter. The die shank is introducible into a shank receptacle of a die receiving section of a joining tool. A fastening contour for fastening the interchangeable die to the joining tool is formed on the interchangeable die. The fastening contour is configured such that a plug-and-turn connection is establishable between the interchangeable die and the joining tool.

11 Claims, 6 Drawing Sheets

(56) References Cited

U.S. PATENT DOCUMENTS

| | | | |
|---|---|---|---|
| 4,189,013 A * | 2/1980 | Adams | E21B 10/38 |
| | | | 175/320 |
| 4,436,464 A * | 3/1984 | Seiberlich | B23B 31/268 |
| | | | 409/233 |
| 4,906,147 A * | 3/1990 | Friesinger | B23B 31/113 |
| | | | 279/97 |
| 5,253,961 A | 10/1993 | Geissler | |
| 5,361,473 A | 11/1994 | Landes | |
| 6,276,464 B1 * | 8/2001 | Draney | E21B 7/046 |
| | | | 166/96.1 |
| 9,796,014 B2 * | 10/2017 | Weyland | B23B 31/28 |
| 2015/0052720 A1 | 2/2015 | Weyland | |
| 2016/0288197 A1 | 10/2016 | Tripp et al. | |
| 2016/0288198 A1 | 10/2016 | Tripp et al. | |
| 2016/0332217 A1 * | 11/2016 | Ahlemeyer | B23Q 3/15566 |

FOREIGN PATENT DOCUMENTS

| | | | |
|---|---|---|---|
| DE | 202006013082 U | 11/2006 | |
| EP | 0314123 A2 * | 5/1989 | F16D 1/112 |
| FR | 2739582 A1 * | 4/1997 | B22D 17/22 |
| GB | 2084913 A | 4/1982 | |

\* cited by examiner

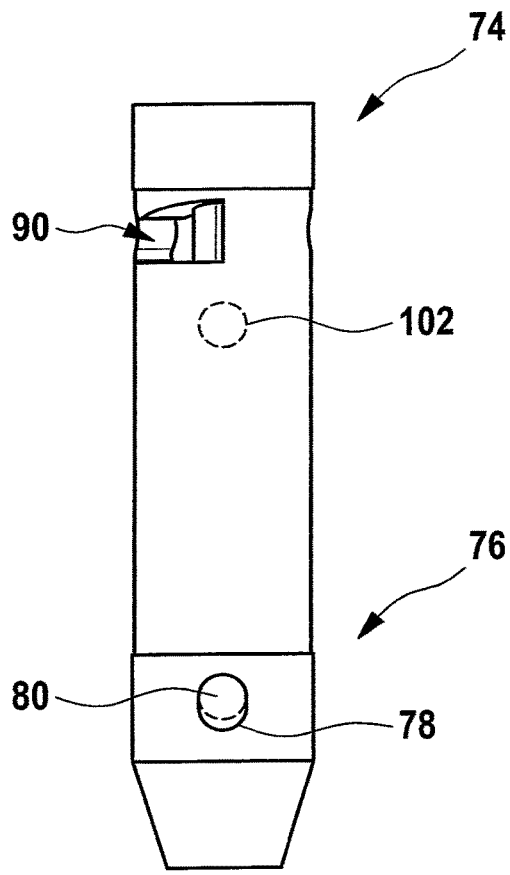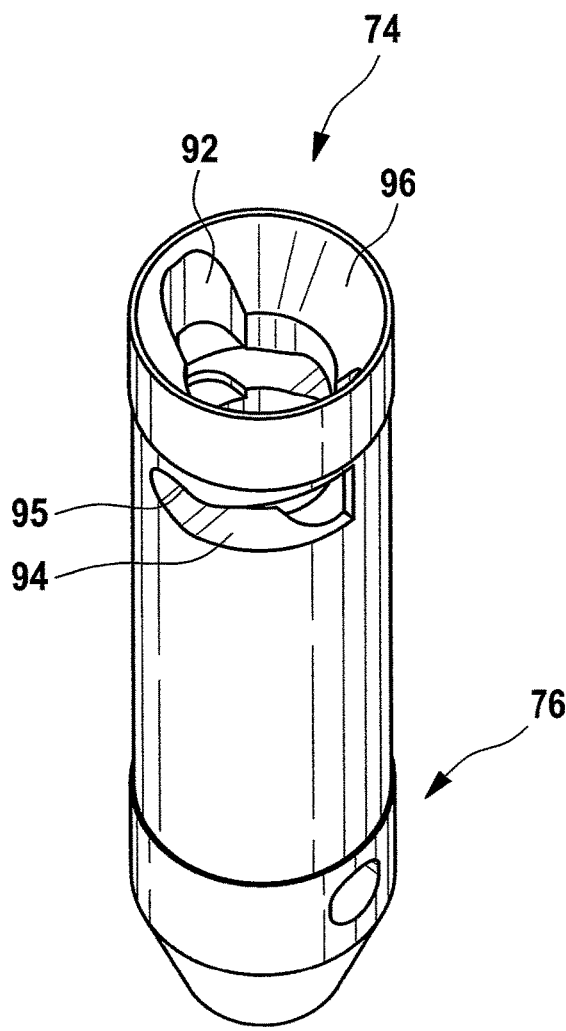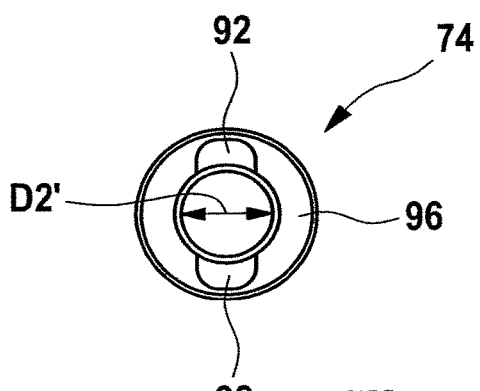

INTERCHANGEABLE DIE, JOINING TOOL AND JOINING METHOD

CROSS-REFERENCE TO RELATED APPLICATIONS

This application is a continuation of international application PCT/EP2016/050280, filed Jan. 8, 2016 which claims priority from German Patent Application No. 102015100922.6 filed Jan. 22, 2015, the disclosures of which are incorporated herein by reference in their entirety.

BACKGROUND OF THE INVENTION

The present invention relates to an interchangeable die for a joining tool, having a die head on which a die feature is formed, and having a die shank extending in an axial direction from the die head, said die shank being introducible into a shank receptacle of a die receiving section of a joining tool, wherein a fastening contour for fastening the interchangeable die to the joining tool is formed on the interchangeable die, wherein the fastening contour is configured such that a plug-and-turn connection is establishable between the interchangeable die and the joining tool.

Furthermore, the present invention relates to a joining tool having a die receiving section for receiving a die shank of an interchangeable die, in particular of an interchangeable die of the type described above, wherein a fastening device for fastening the interchangeable die to the joining tool is formed on the die receiving section, wherein the fastening device is configured such that a plug-and-turn connection is establishable between the interchangeable die and the joining tool.

Finally, the present invention relates to a method for joining by means of a joining tool which has a die receiving section for an interchangeable die, having the steps of transferring an interchangeable die into a die receiving section of the joining tool, wherein an axial relative movement occurs between the die receiving section and the interchangeable die, and carrying out a joining process using the interchangeable die.

Interchangeable dies and joining tools and joining methods of the above-described type are known from the documents DE 20 2013 011 928 U1 and DE 20 2013 011 927 U1.

The interchangeable dies used can be used for clinching or for riveting, in particular for punch riveting. The die feature can be for example an axial recess which is formed in a frustoconical manner, with or without an elevation in the middle, etc.

The joining tool can be a tool that is suitable for the abovementioned joining processes, said tool having in particular a C-frame, on one leg of which the tool, for example a punch press tool, is arranged, and to the other leg of which the interchangeable die is secured.

A concept that has hitherto been conventional for fastening the interchangeable die to the die receiving section consists in providing a transverse bore towards the shank receptacle in the die receiving section. Via said transverse bore, the interchangeable die can be secured for example by means of a grub screw. However, this type of fastening allows automated changing of the die only with a large amount of effort. In addition, the transverse bore is comparatively large and so the die receiving section is weakened in terms of its strength.

In order to avoid the last-mentioned problem, the document DE 20 2006 013 082 U1 discloses providing a die receiving section with a bore, wherein fastening means are provided in the bore, said fastening means being supported on the bore wall of the die receiving section in order to fasten a tool or a tool holder releasably to the die receiving section. This can take place for example by way of a threaded engagement or by way of a screw which acts on a tool holder via the bore, but from an end opposite the die. The document also describes providing, for the purpose of axial securing, clamping means which can be formed according to the spindle-nose principle or are realized using elastomer elements.

Although this avoids the problem of having to provide in the die receiving section a transverse bore for securing the die, automated changing of the die is still difficult to realize.

Interchangeable dies which can be exchanged comparatively easily are known for example from the document DE 103 35 085 A1. The interchangeable dies shown therein have a die head and a die shank, wherein a radial groove is formed on the die shank. On a C-frame, it is possible to provide quick-change receptacles which can be configured for example as latching or clamping connections. Furthermore, the document discloses a changing station on which die heads and dies can be kept in store.

The abovementioned document DE 20 2013 011 928 U1 discloses an interchangeable-die system in which a plug-and-turn connection is establishable between an interchangeable die and a joining tool, an automated changing of dies on a joining tool being possible. The automated changing can in this case, on the one hand, be realizable as quickly as possible. On the other hand, however, preferably high retaining forces can be established in the axial direction between the interchangeable die and the die receiving section, said retaining forces preventing the interchangeable die being pulled accidentally out of the die receiving section following a joining operation.

A plug-and-turn connection is understood to be a connection which is established by a relative axial offset between the interchangeable die and joining tool and a relative rotary offset between the interchangeable die and joining tool, wherein these two relative offsets can take place in succession or in a manner at least partially overlapping one another. A typical plug-and-turn connection is a bayonet connection. Advantages of plug-and-turn connections are described extensively in the documents DE 20 2013 011 928 U1 and DE 20 2013 011 927 U1. Reference is made here to the full content of the disclosure of these two documents.

During the production of a plug-and-turn connection between an interchangeable die and a joining tool of the type described in the document DE 20 2013 011 928 U1, it is difficult to introduce the interchangeable die into the shank receptacle or to pull it out therefrom in an automated manner by means of a robot on account of a relatively long guiding length between the interchangeable die and a shank receptacle of a die receiving section. Furthermore, in a variant disclosed therein, the interchangeable die is pretensioned by means of a spring device which pushes against the interchangeable die from below in the axial direction and pretensions said interchangeable die in the direction out of the shank receptacle. This can result in an underside of a die head protruding slightly with respect to a top side of a die receiving section prior to the start of the joining process, and this can result in micromovements during joining processes. In the variant described in said document, it is also necessary to provide, in an upper part of the die receiving section, adjacent to an introduction opening of the shank receptacle, two transverse bores for receiving transverse pegs that are used for establishing the plug-and-turn connection.

BRIEF SUMMARY OF THE INVENTION

Against this background, it is an object of the invention to specify an improved interchangeable die, an improved joining tool and an improved joining method, wherein preferably at least one of the above-described disadvantages is alleviated or overcome.

In the case of the interchangeable die mentioned at the beginning, this object is achieved in that the die shank has a first axial shank section which is adjacent to the die head and which has a first shank section diameter, wherein the die shank has a second axial shank section which is arranged on the opposite axial side of the first axial shank section from the die head and which has a second shank section diameter which is smaller than the first shank section diameter.

Furthermore, the above object is achieved by a joining tool of the type mentioned at the beginning, wherein the die receiving section has a first axial receiving section which is adjacent to an introduction opening of the die receiving section and which has a first receiving diameter, wherein the die receiving section has a second axial receiving section which is arranged on the opposite side of the first axial receiving section from the introduction opening and has a second receiving diameter which is smaller than the first receiving diameter.

Finally, the above object is achieved by a joining method of the type mentioned at the beginning, wherein a joining tool of the type according to the invention is used as the joining tool and/or wherein an interchangeable die of the type according to the invention is used as the interchangeable die.

In the joining system that is realizable in this way, the die shank and the die receiving section form a coordinated pair, in which the first axial shank section is assigned to the first axial receiving section and in which the second axial shank section is assigned to the second axial receiving section. The subdivision of the die shank and/or of the die receiving section into a first and a second axial section which have different diameters makes it possible to shorten the guiding length compared with interchangeable dies of the type described in the document DE 20 2013 011 928 U1. This makes it possible to introduce the interchangeable die into the joining tool and pull it out therefrom in an automated manner by means of a robot or the like, wherein the risk of jamming on account of skewed positions between the die and joining tool is reduced. Accordingly, what is referred to as a "stick-slip" phenomenon during threading in and out can be prevented or reduced. In addition, this configuration allows, in a number of variants, a radially compact formation of a fastening contour for establishing a plug-and-turn connection.

In a number of variants, this also makes it possible to optimize the die receiving section in the region of an introduction opening with regard to the tension that arises, in that the die receiving section is formed in a solid manner in this region.

The first and the second axial section of the die shank and of the die receiving section, respectively, each have a length greater than zero. Preferably, the diameter is in each case uniform or constant in these axial sections, such that at least one of the axial sections can serve for tilt-free guidance between the interchangeable die and die receiving section.

The axial sections of the die shank and of the die receiving section, respectively, are preferably separated by an intermediate section. The intermediate section preferably likewise has a length greater than zero. Preferably, the intermediate section is formed in a conical or approximately conical manner in order to realize a transition from the first diameter to the second diameter.

The second diameter is preferably less than 0.8 times the first diameter. The axial length of the first axial section of the die shank and of the die receiving section, respectively, is preferably in a range between 0.8 times the axial length of the second axial section and 1.2 times the axial length of the second axial section. The axial length of the intermediate section is preferably at least half the axial length of the first axial section of the die shank and of the die receiving section, respectively, and preferably at least three quarters of this axial length.

The arrangement of the first axial shank section adjacent to the die head means that the first axial shank section can be immediately adjacent to the die head but can also be adjacent to the die head, or the underside thereof, via a transition section, for example a grooved section.

Thus, the object is achieved in full.

According to a preferred embodiment, the fastening contour of the interchangeable die is formed in the region of the second axial shank section. Alternatively or in addition, a radial extent of the fastening contour is less than or equal to the first shank section diameter.

In this embodiment, the first axial shank section can serve exclusively for the purpose of guidance in the region of the die receiving section, in particular at the first axial receiving section thereof. The second axial shank section can likewise serve for guidance, in particular at the second axial receiving section of the die receiving section. As a result of the measure of providing the fastening contour for establishing the plug-and-turn connection to a joining tool in the region of the second axial shank section, the fastening contour can be formed as a radially protruding contour. Furthermore, it is possible to insert a receiving sleeve into the die receiving section, the second axial shank section passing into said receiving sleeve and a fastening device for realizing the plug-and-turn connection in combination with the fastening contour of the interchangeable die preferably being provided on said receiving sleeve.

Forming the fastening contour in the region of the second axial shank section means that the fastening contour can be formed in the axial direction between a first axial end and a second axial end of the second axial shank section. However, in an alternative embodiment, the fastening contour can also be adjacent to the second axial shank section, this likewise being intended to represent a formation in the region thereof.

Provided that a radial extent of the fastening contour is less than or equal to the first shank section diameter, the second axial shank section can easily be introduced into an opening which is only a little larger than the second shaft section diameter, and thus can serve for the guidance thereof.

According to a further preferred embodiment, the fastening contour has at least one locking member which protrudes radially with respect to the die shank.

The locking member can be formed for example in the manner of a bayonet protrusion which is introducible into a bayonet slot of a bayonet-type plug-and-turn connection.

Preferably, the locking member protrudes radially with respect to the second axial shank section. It is particularly preferred for diametrically opposed locking members to be formed on the second axial shank section.

In this respect, it is particularly advantageous for the fastening contour to be formed by a peg-like protrusion which can be formed in one piece with the die shank, or to be formed as a radial peg which is introduced into a radial bore in the die shank.

The peg-like protrusion, or the radial bore, can be formed in particular in the region of the second axial shank section. The peg-like protrusion, or the radial peg, can extend outwardly with respect to the die shank on both axial sides of the radial bore.

In the above-described embodiment, a plug-and-turn connection is established, wherein a locking member is formed on the interchangeable die and wherein a fastening device in the form of a bayonet slot is realized on a die receiving section of a joining tool.

In an alternative embodiment, the fastening contour of the interchangeable die has at least one die bayonet slot which is formed on a nose arrangement which is arranged in the region of a free end of the second axial shank section.

In this embodiment, too, the fastening contour is consequently formed in the region of the second axial shank section. In this case, the interchangeable die is configured to establish a plug-and-turn connection to a joining tool, on the die receiving section of which a radially extending locking member which can interact with the die bayonet slot is formed.

Where reference is made above to a plug-and-turn connection of the interchangeable die to a joining tool, it will be understood that such a plug-and-turn connection can also be established between the interchangeable die and a transfer station. Alternatively, however, the interchangeable die can also be retained on a rotary driving contour in such a transfer station, said rotary driving contour being formed for example on the die head, as is disclosed in the two above-mentioned utility model publications.

In the joining tool according to the invention, it is advantageous for the die receiving section to have a main body and a receiving sleeve, wherein a bore, into which the receiving sleeve is inserted, is formed in the main body.

The main body can be formed for example in the manner of a dome which is attached in a releasable or non-releasable manner to a C-end of a C-frame of such a joining tool.

The receiving bore in the main body can be a blind bore but is preferably a through-bore.

At least a part of the die shank of the interchangeable die can be introduced into the receiving sleeve.

It is particularly advantageous for the second axial receiving section to be formed by the receiving sleeve.

In this embodiment, it is particularly advantageous for the first axial receiving section to be formed by the receiving bore in the main body.

A fastening device for establishing the plug-and-turn connection to the interchangeable die can be arranged on a main body of the die receiving section.

However, it is particularly advantageous for the fastening device to be formed on the receiving sleeve, wherein the receiving sleeve preferably has a receiving sleeve contour which can interact with a fastening contour of the interchangeable die in order to establish the plug-and-turn connection.

Preferably, the receiving sleeve contour has at least one sleeve bayonet slot in which a radial protrusion or some other locking member of the interchangeable die can engage in order to establish the plug-and-turn connection.

In a variant, the receiving sleeve contour has in this case at least one radially inwardly protruding receiving protrusion which can engage in a die bayonet slot of the interchangeable die in order to establish the plug-and-turn connection.

According to a further preferred embodiment which represents a separate invention in conjunction with the preamble of claim 6, the joining tool has a pretensioning spring arrangement by means of which an interchangeable die inserted into the die receiving section is pretensioned in a direction away from an introduction opening of the die receiving section.

As a result, it is possible for an underside of the die head always to be pressed against an upper side of the die receiving section in the region of the introduction opening by means of the pretensioning spring arrangement. Micro-movements during the joining process, as can occur when the die is pretensioned in the opposite direction, can therefore be avoided.

The pretensioning of the pretensioning spring arrangement can also be used to set up a latching arrangement of the plug-and-turn connection. In this case, for example a bayonet slot of the plug-and-turn connection can have an axial groove into which a locking member or a radial protrusion is pushed by means of the pretensioning spring arrangement in order to secure the fastening position of the interchangeable die on the joining tool in a latching manner.

In general, the pretensioning spring arrangement can act in this case between the interchangeable die and the main body of the die receiving section.

However, it is particularly preferable for the receiving sleeve to be pretensioned with respect to the main body in an axial direction away from the introduction opening.

This embodiment is particularly advantageous when a fastening device by means of which the plug-and-turn connection can be established is formed on the receiving sleeve.

Furthermore, it is advantageous here for the receiving sleeve to be pretensioned, in the region of its end directed away from the introduction opening, by means of the pretensioning spring arrangement, which acts in this case between the receiving sleeve and a pretensioning peg which is firmly connected to the main body.

The pretensioning peg can be for example a transverse peg which is guided through a transverse bore in the main body and against which the pretensioning spring arrangement can be supported in order to pretension the receiving sleeve in the direction away from the introduction opening.

In this case, axial elongate holes through which such a pretensioning peg or transverse peg passes can be provided in the receiving sleeve. This also makes it possible at the same time for the axial travel of the receiving sleeve to be limited by means of such elongate holes. The maximum travel can correspond for example to the depth of a latching groove which is provided for example in the region of a bayonet slot. Overall, it is furthermore preferred for die latching means to be formed on the interchangeable die such that the interchangeable die is securable in a latching manner in a rotary and/or longitudinal position with respect to the joining tool.

As a result, it is possible to ensure that the form-fitting and/or force-fitting connection between the interchangeable die and die receiving section is not accidentally released.

According to a further embodiment that is preferred overall, a rotary driving contour is formed on the interchangeable die, it being possible for a rotation device for rotating the interchangeable die to act on said rotary driving contour and said rotary driving contour preferably being formed on the die head.

By means of such a rotary driving contour it is firstly possible to rotate the interchangeable die in a targeted manner in order to establish the plug-and-turn connection.

Furthermore, by way of the rotary driving contour, it is possible to keep the interchangeable die in a defined rotary position in a transfer station.

A transfer station serves to temporarily store at least one interchangeable die, wherein the interchangeable die can be taken out of the transfer station by a joining tool in order to carry out at least one joining operation using the interchangeable die and can be stored back in the transfer station once the joining operation has been carried out. Preferably, such a transfer station has a rotation device for rotating the interchangeable die, such that when the interchangeable die is taken out of storage, a plug-and-turn connection is establishable between the interchangeable die and the joining tool.

Such a transfer station can form a joining tool system together with the joining tool and a plurality of interchangeable dies.

In the transfer station, it is furthermore preferred for the interchangeable die to be retained therein exclusively by way of its die head, wherein the die shank protrudes with respect to an interchangeable die receptacle of the transfer station such that the joining tool is movable in such a way that the die shank of an interchangeable die retained in the transfer station is introduced into the shank receptacle of a die receiving section of the joining tool.

By way of the rotary driving contour, the interchangeable die can in this case preferably be set in rotation (or be held in a rotary position) in order to establish the plug-and-turn connection.

According to a further preferred configuration, the interchangeable die is equipped with identification means which are optically detectable, and/or equipped with identification means which, in the event of a movement of the interchangeable die relative to a die receiving section, can generate a characteristic acoustic signal which is acoustically detectable.

Furthermore, in the joining tool according to the invention, it is advantageous overall for provision to be made of tool latching means which are configured to interact with die latching means in order to secure an interchangeable die received in the die receiving section in a latching manner in a rotary and/or longitudinal position.

It goes without saying that the abovementioned features and those yet to be explained below are usable not only in the combination given in each case but also in other combinations or on their own without departing from the scope of the present invention.

BRIEF DESCRIPTION OF THE SEVERAL VIEWS OF THE DRAWINGS

Exemplary embodiments of the invention are illustrated in the drawing and explained in more detail in the following description. In the drawing:

FIG. 9 shows a side view of a receiving sleeve of the die receiving section from FIG. 6;

FIG. 10 shows a perspective view of the receiving sleeve from FIG. 9, and

FIG. 11 shows a plan view of the receiving sleeve from FIG. 9.

DETAILED DESCRIPTION OF THE PREFERRED EMBODIMENTS

Figure 1:
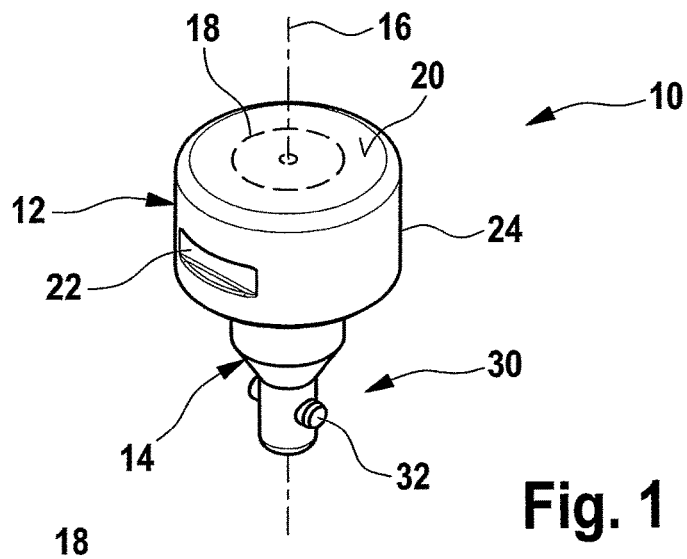
FIG. 1 shows a perspective view of a first embodiment of an interchangeable die according to the invention.

FIGS. 1 to 4 schematically illustrate an embodiment of an interchangeable die according to the invention that has the overall designation 10.

The interchangeable die 10 has a die head 12 which is preferably circular in cross section, and also a die shank 14 which is preferably likewise circular in cross section. The diameter of the die shank 14 is preferably smaller than that of the die head 12. A longitudinal axis is shown at 16.

The die head 12 has a head end side 20 which is remote from the die shank 14. Formed on the head end side 20 is a die feature 18, for example in the form of an axial recess, as is conventional for punch riveting or for other joining processes.

Formed on a head circumferential section 24 of the die head 12 is a rotary driving contour 22 which can be formed for example by one or two radial grooves that extend in a chord-like manner.

A shank circumferential section is designated 26 in the figures. A shank end side remote from the die head 12 is designated 28.

Figure 2:
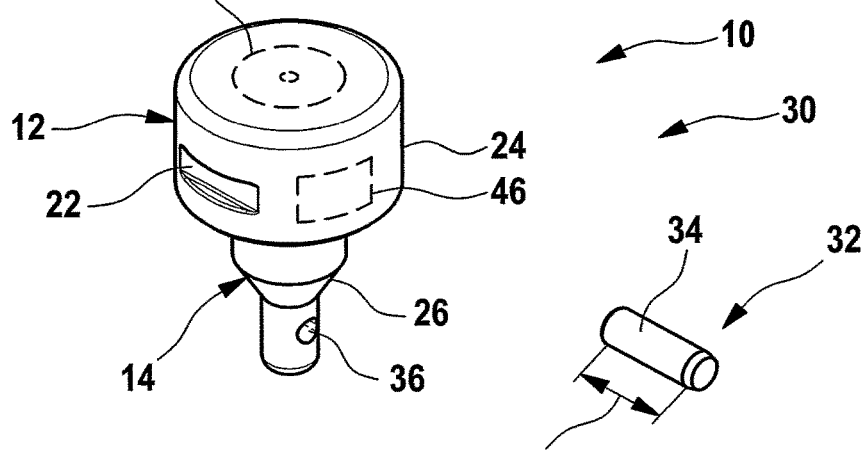
FIG. 2 shows an exploded illustration of the interchangeable die from FIG. 1.
Figure 3:
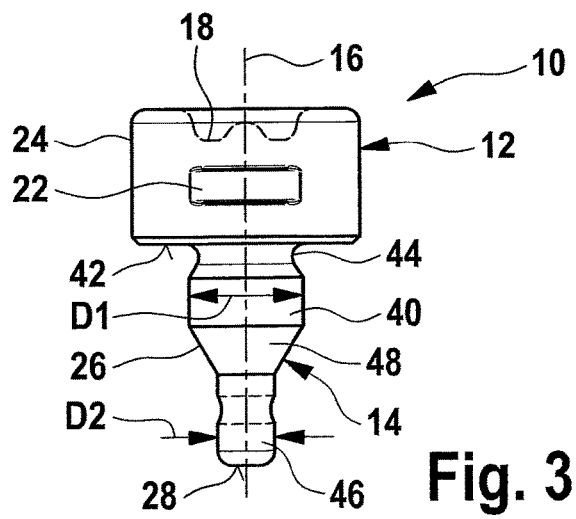
FIG. 3 shows a side view of the interchangeable die from FIG. 1.
Figure 4:
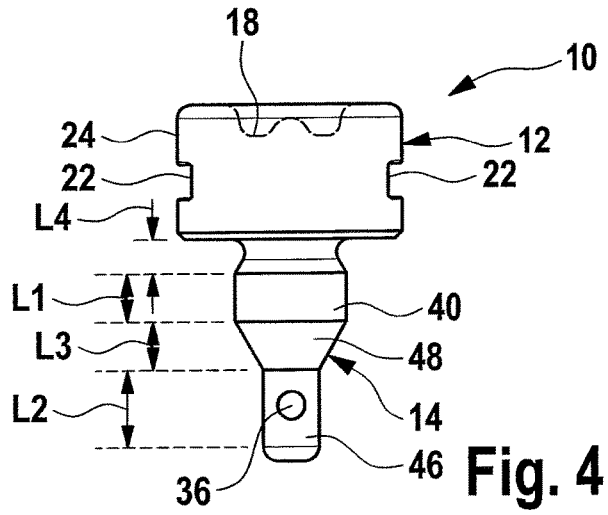
FIG. 4 shows a side view, rotated through 90° compared with FIG. 3, of the interchangeable die from FIG. 1.

Formed on the die shank 14 is a fastening contour 30. The fastening contour 30 serves to establish a plug-and-turn connection to a die receiving section of a joining tool. The fastening contour 30 is formed in the present case by a locking member 32 which protrudes radially with respect to the die shank 14. As is illustrated in FIG. 2, the locking member 32 is formed by a radial peg 34 which is inserted into a radial bore 36 in the die shank 14 such that the radial peg 34 projects at both ends of the radial bore 36 with respect to the die shank 14.

The die shank 14 has a first axial shank section 40 which is adjacent to the head underside 42 of the die head 12. To be more precise, the first axial shank section 40 is adjacent to the head underside 42 via a grooved section 44. The first axial shank section 40 has an axial length L1 and has a first shank section diameter D1 that is uniform and constant along the axial length L1 (see FIGS. 3 and 4).

The die shank 14 furthermore has a second axial shank section 46 which is arranged on the opposite axial side of the first axial shank section 40 from the die head 12. The second axial shank section 46 has an axial length L2 and a diameter D2 that is uniform and constant along this axial length L2 and is smaller than D1. The transverse bore 36 passes through the die shank 14 in the region of the second axial shank section 46, specifically approximately in the axial centre thereof.

The first axial shank section 40 and the second axial shank section 46 are spaced apart from one another via an intermediate section 48 which is in the form of a cone section in the present case. The intermediate section 48 has an axial length L3. Furthermore, the grooved section 44 has an axial length L4. Furthermore, the radial peg 34 has a length L5. With regard to these dimensions, the following relationships preferably apply:

$$0.8L2 < L1 < 1.2 \times L2$$

$$D2 < 0.85 \times D1$$

$$L3 \geq 0.5 \times L1$$

$$L5 \leq D1$$

$$L5 \geq D2.$$

The above relationships apply either in isolation or in any desired combination with one another.

Figure 5:
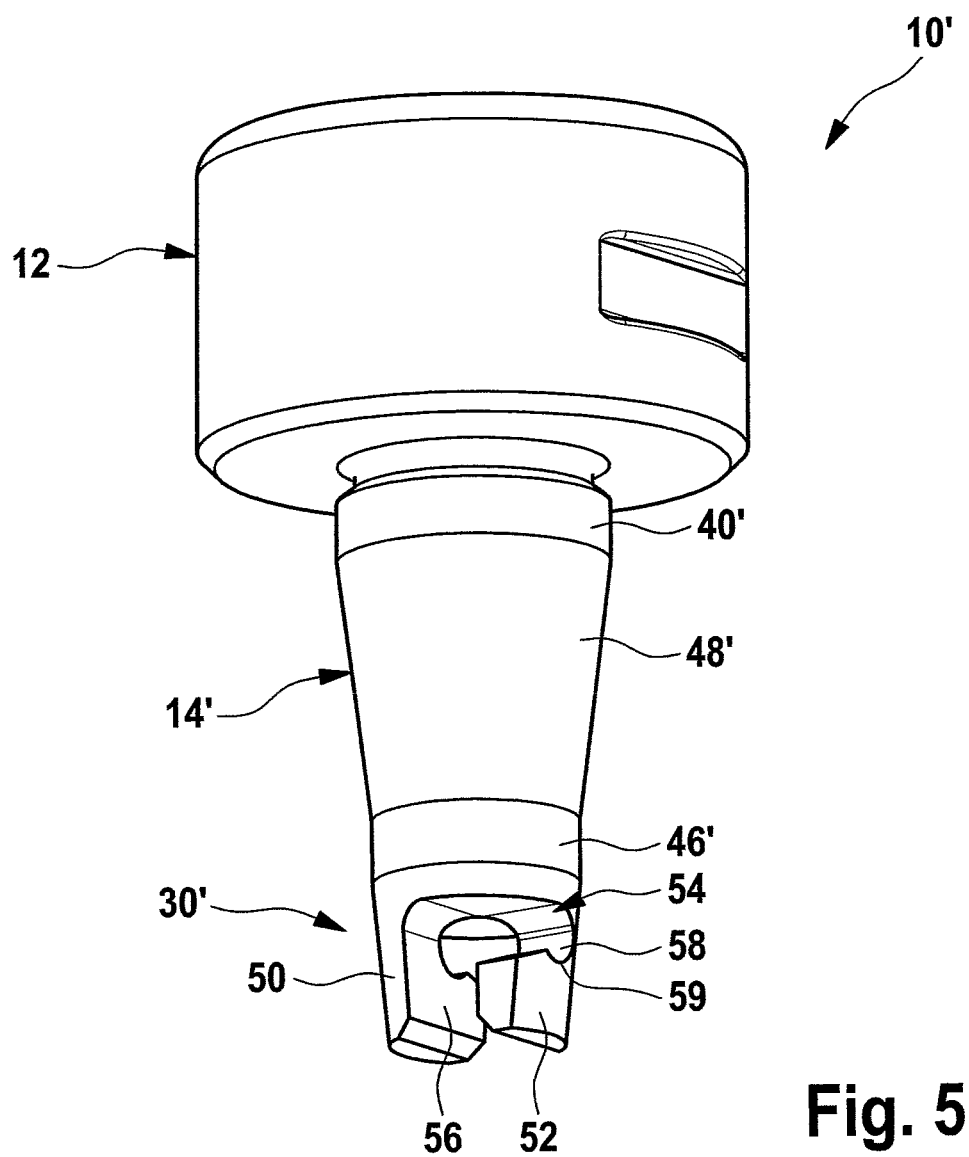
FIG. 5 shows a perspective view of a further embodiment of an interchangeable die according to the invention.
Figure 6:
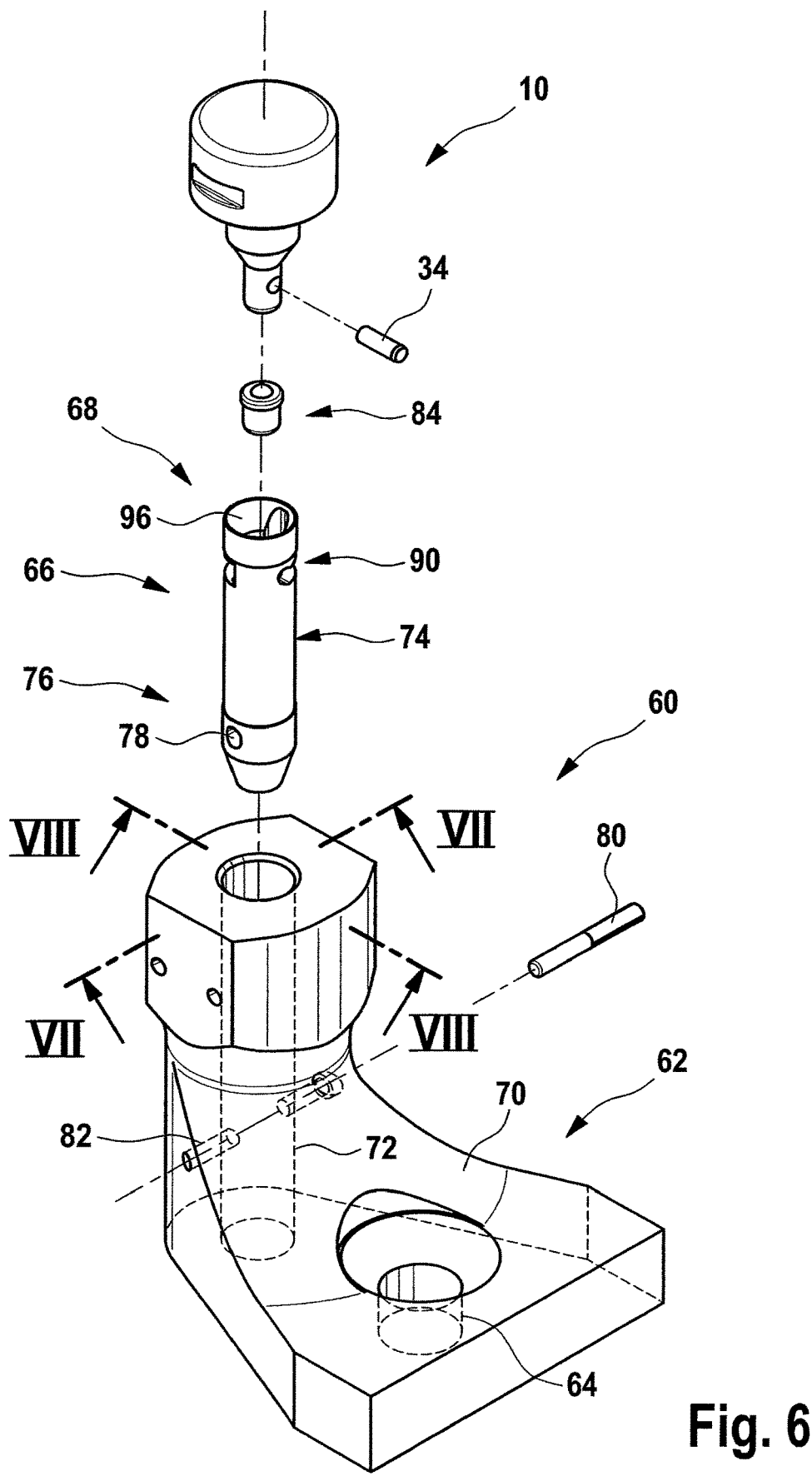
FIG. 6 shows an exploded illustration of the interchangeable die from FIGS. 1 to 4 and of a die receiving section of a joining tool.

FIG. 5 illustrates an alternative embodiment of an interchangeable die 10' which, in terms of structure and operation, corresponds overall to the interchangeable die 10 in FIGS. 1 to 4. Identical elements are therefore characterized by identical reference signs. In the following text, it is essentially the differences that are explained.

The die shank 14' has an intermediate section 48', the axial length of which is greater, in particular greater than three times, the axial lengths of the first axial shank section 40' and of the second axial shank section 46'. The axial lengths of the first axial shank section 40' and of the second axial shank section 46' are approximately the same.

The fastening contour 30' is provided in the region of the second axial shank section 46, specifically in a manner adjoining the free end of the second axial shank section. In this case, the fastening contour 30' is formed by a first nose 50 and a second nose 52 which project in the axial direction with respect to the free end of the second axial shank section 46'. The two noses 50, 52 are shaped such that they form a die bayonet slot 54 which forms the fastening contour 30' in the present case. The die bayonet slot 54 contains a die introduction slot 56, which is formed in the radial direction between the two noses 50, 52, and a die locking slot 58. In order to establish a plug-and-turn connection, a locking member in the form of a transverse peg can be introduced axially between the noses 50, 52 in the region of the die introduction slot 56. By way of a subsequent relative rotation, such a locking member then passes into the die locking slot 58, which is oriented substantially radially or tangentially and can contain a latching groove into which such a transverse peg can pass in a mounted position in order to secure this mounted position in a latching manner.

The plug-and-turn connection corresponds substantially to a bayonet connection in this case.

FIGS. 6 to 11 illustrate a section of a joining tool 60, wherein the joining tool 60 in the present case has a die holder 62 in the form of a dome which is rigidly connected to a frame of the joining tool 60 via a releasable connection, for example to a C-frame for punch riveting processes. In order to establish the releasable connection, the die holder 62 is provided with a fastening bore 64. The die holder 62 is consequently easily exchangeable. However, the die holder can also be connected to the C-frame integrally or in one piece.

Formed on the die holder 62 is a die receiving section 66 into which an interchangeable die 10 from FIGS. 1 to 4 can be inserted. The die receiving section 66 contains a fastening device 68 which interacts with the fastening contour 30 of the interchangeable die from FIGS. 1 to 4 such that a plug-and-turn connection in the manner of a bayonet connection is establishable between the interchangeable die 10 and the die receiving section 66.

The die holder 62 has a main body 70 on which the fastening bore 64 is provided and which has a section that extends in a dome-like manner and in which an axially continuous receiving bore 72 is formed. The die holder 62 furthermore has a receiving sleeve 74 which is inserted into the receiving bore 72. The receiving sleeve 74 is pretensioned by means of a pretensioning spring device 76 in a direction axially away from an introduction opening of the receiving bore 72. To this end, the receiving sleeve 74 has two elongate holes 78 through which a transverse peg 80 passes, said transverse peg 80 being introduced into a transverse bore 82 in the main body 70. The receiving sleeve 74 is consequently mounted so as to be displaceable in a limited manner with respect to the main body by the axial length of the elongate holes 78. The pretensioning spring device 76 has a spring arrangement 84 made of a cage having a spring formed therein and for example a pressure ball. The spring arrangement 84 acts in the axial direction between the transverse peg 80 and an annular shoulder 86 of the receiving sleeve 74, said annular shoulder 86 being formed on the opposite side of the transverse peg 80 from the introduction opening of the receiving bore 72. The spring arrangement 84 consequently pretensions the receiving sleeve 74 with respect to the main body 70 in an axial direction away from the introduction opening of the receiving bore 72.

Figure 7:
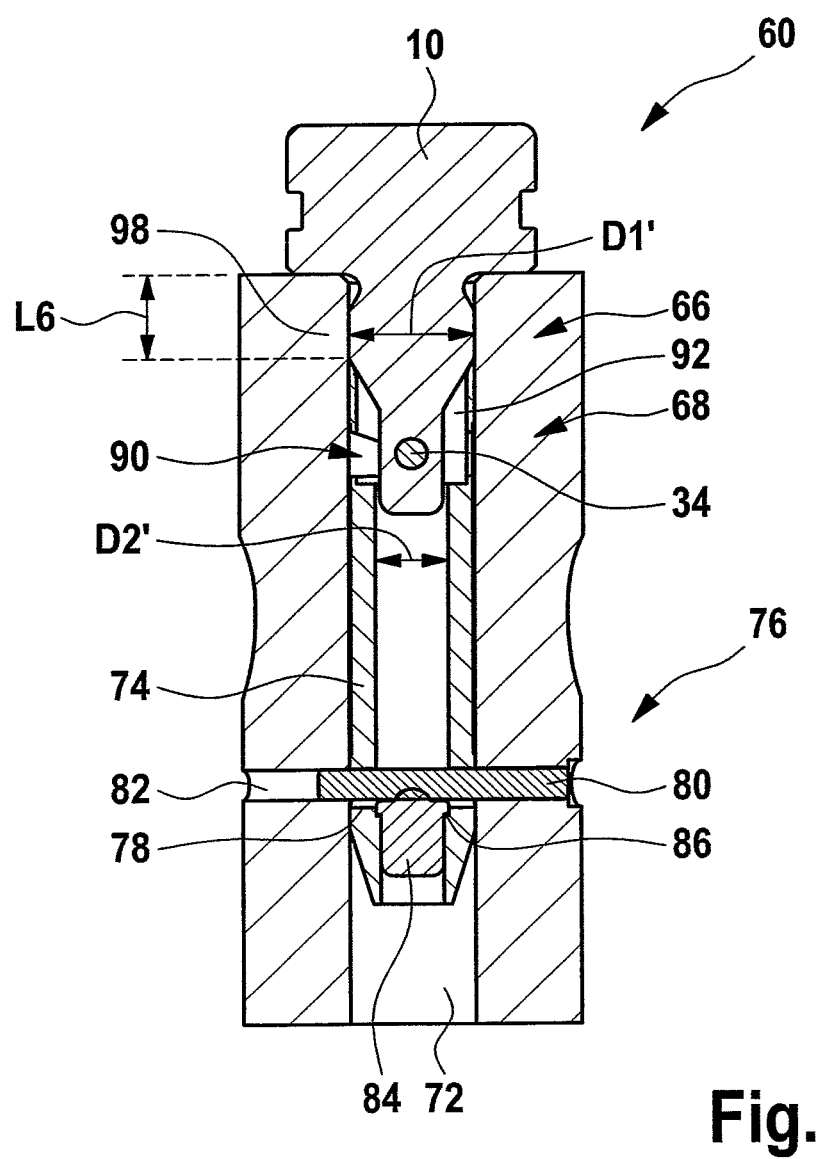
FIG. 7 shows a sectional view of the die receiving section and of the interchangeable die in the inserted state, wherein a plug-and-turn connection has been produced, on the line VII-VII in FIG. 6.
Figure 8:
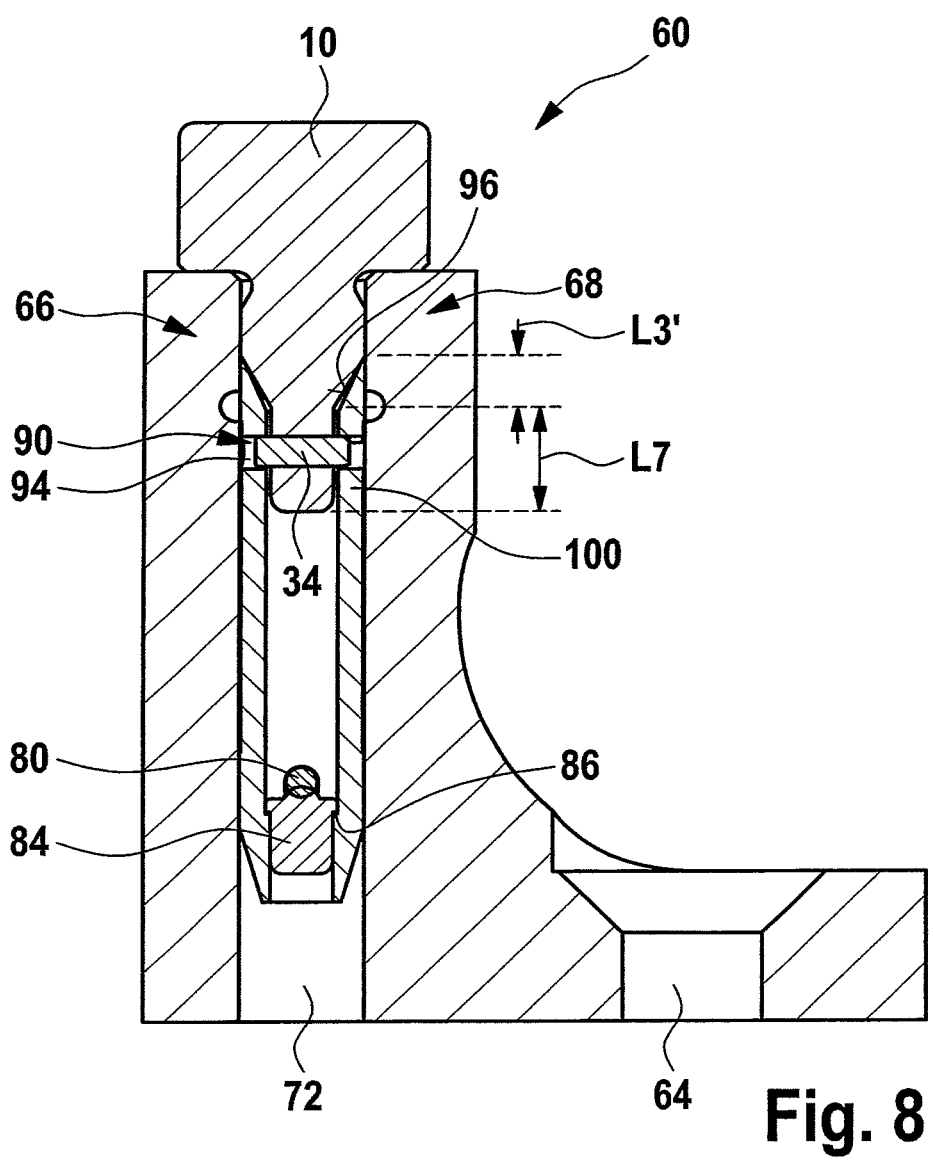
FIG. 8 shows a view comparable to FIG. 7, but rotated through 90°, on line VIII-VIII in FIG. 6.

In this pretensioned position, an axial end, adjacent to the introduction opening, of the receiving sleeve 74 is spaced apart from the introduction opening, as is illustrated in FIG. 7 at L6 and FIG. 8. A sleeve bayonet slot 90 is formed in the region of this end of the receiving sleeve 74. The sleeve bayonet slot 90 has a sleeve introduction slot 92 which is shaped (see FIG. 11) in such a way that the radial peg 34 of the interchangeable die 10 from FIGS. 1 to 4 can be introduced into the sleeve introduction slot 92 in the axial direction. The sleeve bayonet slot 90 furthermore has a sleeve locking slot 94 into which the radial protrusions formed by the radial peg 34 can be introduced when the interchangeable die 10 is rotated relative to the joining tool 60, in order in this way to establish a plug-and-turn connection in the manner of a bayonet connection.

A latching depression 95 into which the radial peg 34 is pushed by means of the spring arrangement 84 can be provided at a circumferential end of the sleeve locking slot 94 in order to be able to secure the established locking position in a latching manner.

In the region of its upper end, the receiving sleeve 74 has an introduction cone 96 which substantially connects an outer circumference of the receiving sleeve 74 to the inner circumference of the inner bore in the receiving sleeve 74. As is illustrated in FIG. 8, the introduction cone 96 preferably has a different angle from the conically formed intermediate section 48 of the interchangeable die.

The receiving sleeve 74 is mounted in the axial direction with respect to the receiving bore 72 in such a way that a first axial receiving section 98, which has an axial length L6, is formed between the introduction opening of the receiving bore 72 and the upper end of the receiving sleeve 74. The axial length L6 is preferably greater than the length L1 of the first axial shank section 40. The introduction cone 96 extends along an axial length L3' which corresponds to the axial length of the intermediate section 48. Furthermore, an inner circumference of the inner bore in the receiving sleeve 74 forms a second axial receiving section 100 which has an axial length L7 that is greater than the axial length L2 of the second axial shank section 46.

The first axial receiving section 98 has a diameter D1' which corresponds to the diameter D1 of the first axial shank section, such that the first axial shank section 40 can be guided in a tilt-free manner in the first axial receiving section 98.

The inner bore in the receiving sleeve 74, or the diameter of the second axial receiving section 100 (designated D2' in FIG. 7), is preferably greater than the diameter D2 of the second axial shank section 46. In this case, a guiding function can be established between the second axial shank section 46 and the second axial receiving section 100, although this is not absolutely necessary.

When an interchangeable die 10 is introduced into the die receiving section 68, first of all the second axial shank section 46 enters the receiving bore 72. In the event of misalignments, the second axial shank section 46 can be threaded into the bore in the receiving sleeve 74 via the introduction cone 96, this taking place approximately simultaneously with the introduction of the first axial shank section 40 into the receiving bore 72 in the main body 70. In this case, the radial peg 34 first of all enters the sleeve introduction slot 92. Subsequently, a relative rotation takes place, in which the radial peg 34 enters the sleeve locking slot 94 and in the process deflects the receiving sleeve 74 optionally counter to the force of the spring arrangement 84, until optionally the radial peg 34 latches into the latching depression 95. Such a movement requires only a small axial guiding length and can consequently be carried out easily even by a robot, by means of which it is difficult to precisely execute relatively long axial guiding lengths in space.

As a result of the spring device 84, the interchangeable die 10 is pulled away in the direction of the introduction opening by means of the receiving sleeve 74 such that the head underside 42 comes into abutment against a top side of the main body 70. Micromovements during joining operations can therefore be avoided. Since no transverse bores are to be provided in the region of an upper end of the main body, the latter can be formed in a solid manner and therefore be provided with high stability. Although two such transverse bores can be seen in FIGS. 6 and 8, it is possible to dispense with these transverse bores in the embodiment according to the invention.

If the joining tool 60 is intended to be set up for an interchangeable die 10' from FIG. 5, the receiving sleeve 74, rather than a sleeve bayonet slot 90, can have for example in this region a transverse peg which passes between the noses 50, 52 during the introduction of the interchangeable die 10' and can be introduced into the die locking slot 58 from FIG. 5 during a relative rotation.

A transverse peg of this kind is indicated schematically at 102 in FIG. 9.

Although exemplary embodiments of the present invention have been shown and described, it will be appreciated by those skilled in the art that changes may be made to these embodiments without departing from the principles and spirit of the invention, the scope of which is defined in the appended claims and their equivalents.

The invention claimed is:

1. An interchangeable die introducible into a shank receptacle of a die receiving section of a joining tool, wherein the interchangeable die comprises:
  a die head including a first axial end, a second axial end, and a first cylindrical section in-between, on the first axial end a die feature is formed, and a rotary driving contour extends as a chord through the first cylindrical section;
  a die shank extending in an axial direction from the second axial end of the die head, the die shank being introducible into the shank receptacle of the die receiving section of the joining tool, and the die shank includes:
    a circumferential groove below the second axial end of the die head and defining a groove diameter;
    a first axial shank section axially below the circumferential groove and which is cylindrical and has a first shank section diameter greater than the groove diameter;
    an intermediate shank section located axially below the first axial shank section and frusto-conically shaped tapering axially downward;
    a second axial shank section which is below the intermediate shank section and includes a second cylindrical section of a second shank section diameter which is smaller than the first shank section diameter; and
    a locking member including a peg for fastening the interchangeable die to the joining tool is formed on the second axial shank section, and the locking member is configured such that a plug-and-turn connection is establishable between the interchangeable die and the joining tool, and the peg is radially extending for a peg length, and the peg length is equal to or less than the first shank section diameter, and the peg length is equal to or greater than the second shank section diameter.

2. The interchangeable die according to claim 1, wherein the first axial section defines a first axial length, and the second axial section defines a second axial length greater than the first axial length.

3. The interchangeable die according to claim 2, wherein the intermediate axial section defines a third axial length less than the first axial length.

4. A joining tool comprising:
  an interchangeable die including:
    a die head including a first axial end, a second axial end, and a cylindrical section in-between, on the first axial end a die feature is formed and a rotary driving contour extends as a chord through the cylindrical section;
    a die shank extending in an axial direction from the second axial end of the die head, and the die shank includes:
      a circumferential groove below the second axial end of the die head and defining a groove diameter;
      a first axial shank section axially below the grooved section and which is cylindrical and has a first shank section diameter greater than the groove diameter;
      an intermediate shank section located axially below the first axial shank section and frusto-conically shaped tapering axially downward;
      a second axial shank section which is below the intermediate shank section and includes a cylindrical section of a second shank section diameter which is smaller than the first shank section diameter; and
      a locking member including a peg operable for fastening the interchangeable die to the joining tool with a plug-and-turn connection is formed on the second axial shank section; and a die receiving section for receiving the die shank of the interchangeable die, the die receiving section including a first axial receiving section which is adjacent to an introduction opening of the die receiving section and which has a first receiving diameter, and the die receiving section has a second axial receiving section which is arranged on the opposite side of the first axial receiving section from the introduction opening and has a second receiving diameter which is smaller than the first receiving diameter; and a fastening device for fastening the interchangeable die to the joining tool is formed on the die receiving section, and the fastening device is configured such that a plug-and-turn connection is establishable between the interchangeable die and the joining tool.

5. The joining tool according to claim 4, and further comprising a pretensioning spring arrangement by means of which the interchangeable die in the die receiving section is pretensioned in a direction away from the introduction opening of the die receiving section.

6. The joining tool according to claim 5, wherein the die receiving section further includes a main body and a receiving sleeve; and a receiving bore, into which the receiving sleeve is inserted, is formed in the main body; and the receiving sleeve is pretensioned with respect to the main body in an axial direction away from the introduction opening.

7. The joining tool according to claim 4, wherein the die receiving section further includes a main body and a receiving sleeve; and a receiving bore, into which the receiving sleeve is inserted, is formed in the main body.

8. The joining tool according to claim 7, wherein the second axial receiving section is formed by the receiving sleeve.

9. The joining tool according to claim 6, wherein the receiving sleeve is pretensioned, in the region of its end directed away from the introduction opening, by means of the pretensioning spring arrangement, which acts between the receiving sleeve and a pretensioning peg which is firmly connected to the main body.

10. The joining tool according to claim 7, wherein a receiving sleeve contour, which can interact with the locking member including a peg of the interchangeable die in order to establish the plug-and-turn connection, is formed on the receiving sleeve.

11. The joining tool according to claim 10, wherein the receiving sleeve contour has a sleeve bayonet slot in which a radial protrusion of the interchangeable die can engage in order to establish the plug-and-turn connection.

* * * * *